(12) United States Patent
Thekkath

(10) Patent No.: US 8,024,539 B2
(45) Date of Patent: Sep. 20, 2011

(54) VIRTUAL PROCESSOR BASED SECURITY FOR ON-CHIP MEMORY, AND APPLICATIONS THEREOF

(75) Inventor: Radhika Thekkath, Palo Alto, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 906 days.

(21) Appl. No.: 12/021,110

(22) Filed: Jan. 28, 2008

(65) Prior Publication Data
US 2009/0193177 A1    Jul. 30, 2009

(51) Int. Cl.
*G06F 12/00*    (2006.01)

(52) U.S. Cl. ......... 711/163; 711/103; 711/147; 711/170
(58) Field of Classification Search ........................ None
See application file for complete search history.

(56) References Cited

OTHER PUBLICATIONS

*Multithreading review—the outcomes: Words, words, words*, pp. 1-8, printed from http://ukwww.mips.com/mt/minutes.html, date appears to be Sep. 14, 2005.

*Primary Examiner* — Shawn X Gu
(74) *Attorney, Agent, or Firm* — Sterne, Kessler, Goldstein & Fox, P.L.L.C.

(57) ABSTRACT

A processor-based method, system and apparatus to comprise a method, system and apparatus to access a memory location in an on-chip memory based on a virtual processing element identification associated with an instruction. The system comprises multiple virtual processing elements, an access list and a comparator coupled to the memory and the access list. In response to an instruction from a virtual processing element to access a memory location in the memory, the comparator compares a first virtual processing identification associated with the instruction to a second virtual processing identification stored in the access list and grants access to the virtual processing element that generated the instruction to read from or write to the memory location if the first virtual processing element identification is equal to the second virtual processing element identification. The data in the memory is allocated and de-allocated by software.

28 Claims, 8 Drawing Sheets

VIRTUAL PROCESSOR BASED SECURITY FOR ON-CHIP MEMORY, AND APPLICATIONS THEREOF

FIELD OF THE PRESENT INVENTION

The present invention generally relates to processors.

BACKGROUND OF THE PRESENT INVENTION

Sharing memory between processors, virtual processing elements or thread contexts conventionally requires coordination between the sharing entities to avoid corruption of memory. This usually requires additional overheard in terms of signaling as in test and set locks or a memory coherency scheme. Furthermore, in the event that the sharing entities are unaware of each other, memory may be corrupted due to inadvertent overwriting of another entity's data. There is also a need for security against malicious software running one or more processors/virtual processing elements.

What are needed are new memory security measures that overcome the deficiencies noted above.

BRIEF SUMMARY OF THE PRESENT INVENTION

Embodiments of the invention comprise a method, system and apparatus to access a memory location in a Random Access Memory (RAM) based on a virtual processing element identification associated with an instruction. The system comprises multiple virtual processing elements, a scratch pad Random Access Memory, an access list and a comparator coupled to the RAM and the access list. In response to an instruction from a virtual processing element to access a memory location in the RAM, the comparator compares a first virtual processing identification associated with the instruction to a second virtual processing identification stored in the access list and grants access to the virtual processing element to read from or write to the memory location if the first virtual processing element identification is equal to the second virtual processing element identification. Data in the RAM is allocated and de-allocated by software. In one embodiment, the access list is instantiated in hardware and cannot be read from or written to by software.

Further embodiments, features, and advantages of the present invention, as well as the structure and operation of various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the present invention and to enable a person skilled in the pertinent art to make and use the present invention.

The present invention is described with reference to the accompanying drawings. The drawing in which an element first appears is typically indicated by the leftmost digit or digits in the corresponding reference number.

DETAILED DESCRIPTION OF THE PRESENT INVENTION

The present invention provides a virtual processor based memory security mechanism, and applications thereof. In the detailed description of the present invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In an embodiment, the present invention provides a system to securely access to a memory location in an on-chip memory based on a virtual processing element identification associated with an instruction. The system comprises multiple virtual processing elements, an access list and a comparator coupled to the memory and the access list. In response to an instruction from a virtual processing element to access a memory location in the memory, the comparator compares a first virtual processing identification associated with the instruction to a second virtual processing identification stored in the access list and grants access to the virtual processing element to read from or write to the memory location if the first virtual processing element identification is equal to the second virtual processing element identification. In conventional systems, memory is allocated and de-allocated by memory controllers. In an embodiment of the present invention, data in the on-chip memory is allocated and de-allocated solely by software. In one embodiment, the access list is instantiated in hardware and cannot be read from or written to by software.

Figure 1A:
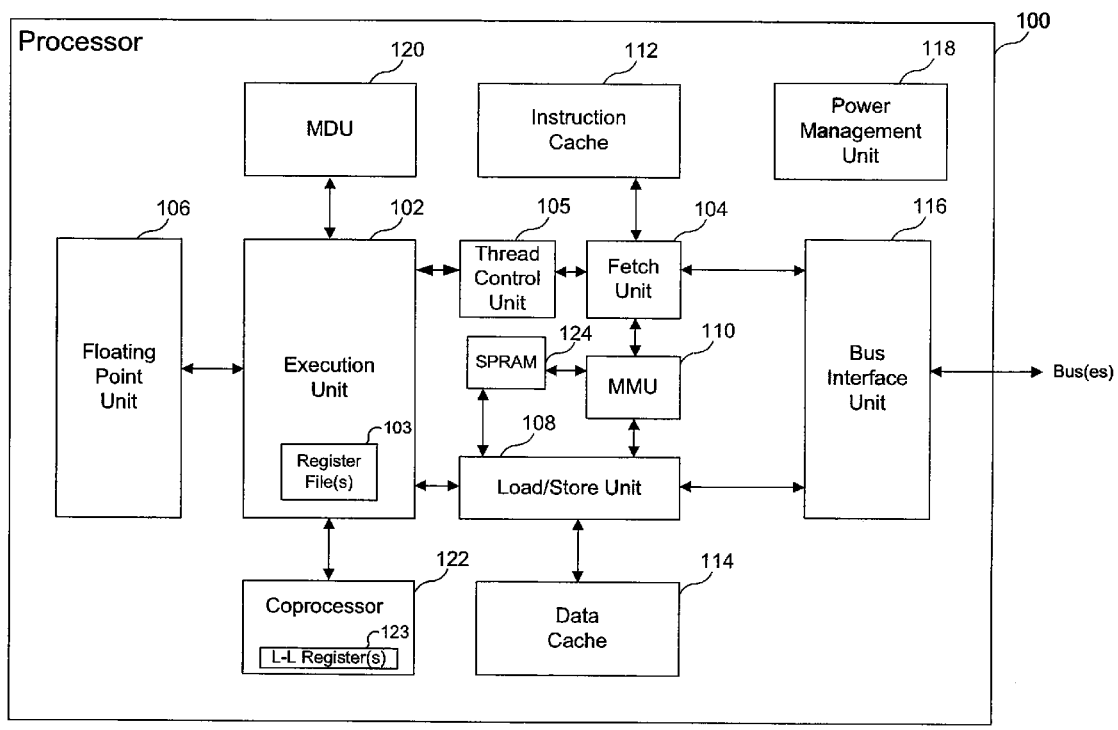
FIG. 1A is a diagram of a processor according to an embodiment of the present invention.

FIG. 1A is a diagram of an exemplary digital circuit or processor 100 according to an embodiment of the present invention. It is to be noted, however, that the present invention is not limited to just processors or processing circuits.

Processor 100 includes an execution unit 102, a fetch unit 104, a thread control unit 105 (e.g., in the case of a multi-threading processor), a floating point unit 106, a load/store unit 108, a memory management unit (MMU) 110, an instruction cache 112, a data cache 114, a bus interface unit 116, a power management unit 118, a multiply/divide unit (MDU) 120, scratch pad RAM (SPRAM) 124 and a coprocessor 122. The design and operation of these elements of processor 100 are known to persons skilled in the relevant art(s). These elements of processor 100 are illustrative and not intended to limit the present invention.

Thread control unit 105 is present in a multithreading processor and is used to schedule instruction threads. In an embodiment, thread control unit 105 includes a policy manager that ensures processor resources are shared by executing threads. Thread control unit 105 interfaces with execution unit 102 and fetch unit 104.

Memory 124 is an on-chip memory. In one embodiment, memory 124 is accessed in lieu of memories such as data cache 114 and instruction cache 112. In another embodiment, memory 124 is a scratch pad RAM (SPRAM) 124 comprising on-chip RAM that may be a Dynamic RAM (DRAM) or a Static RAM (SRAM). In an embodiment, distinct SPRAM 124 blocks (i.e. data SPRAM and instruction SPRAM—not shown) are present for instruction and data references. SPRAM 124 may be accessed in parallel with instruction cache 112 or data cache 114. The scratch pad RAM provides a fixed latency access while data cache 114 or instruction cache 112 would require a number of undeterminable cycles to access main memory 310 (see FIG. 3) through BIU 116. SPRAM 124 supports both instruction and data references. In an embodiment, a block in SPRAM 124 occupies one continuous region in a physical address space. SPRAM 124 wrappers contain the base physical address and size information. In an embodiment, SPRAM 124 is virtually indexed. It is to be appreciated that the type of memory 124 used is a design choice and may be arbitrary.

In an embodiment, SPRAM 124 differs from instruction cache 112, data cache 114 and main memory 310 in that software ensures that an entry in SPRAM 124 has been initialized before it is read, to avoid reading spurious data. In an embodiment, data in SPRAM 124 is allocated and de-allocated solely by software. SPRAM 124 does not refill automatically like a cache. Data SPRAM and instruction SPRAM may be initialized with stores (or direct memory access (DMA) writes) to the desired address range. Store operations which result in a hit in the data SPRAM do not result in a write to main memory. In contrast, write-through stores that hit in a cache write to main memory 310. SPRAM 124 can be mapped to either cached or uncached address space. The address decode and comparison for SPRAM 124 is done regardless of cacheability attributes of data.

Coprocessor 122 performs various overhead functions for processor 100. In one embodiment, coprocessor 122 is responsible for virtual-to-physical address translations, implementing cache protocols, exception handling, operating mode selection, and enabling/disabling interrupt functions.

Figure 1B:
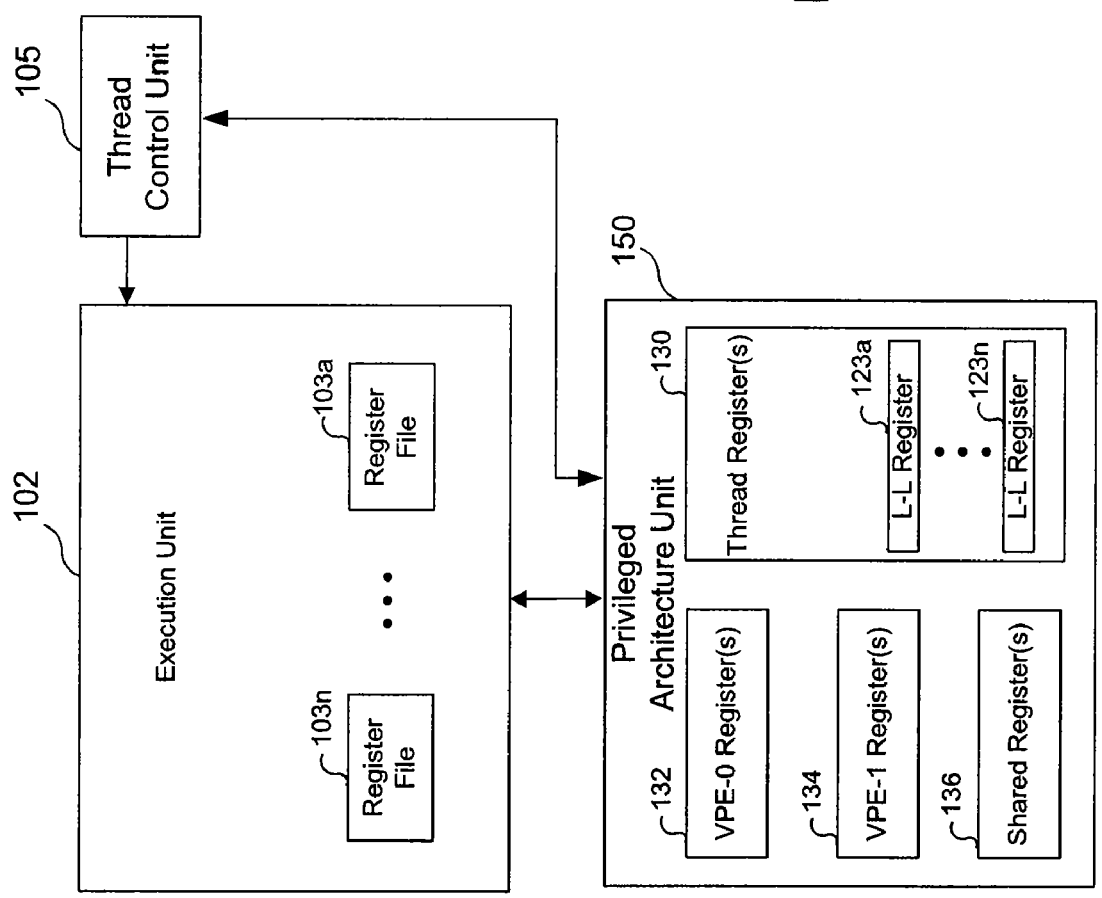
FIG. 1B is a diagram that illustrates a portion of a multi-threading processor according to an embodiment of the present invention.

FIG. 1B is a diagram that illustrates a portion of a multi-threading processor according to an embodiment of the present invention. As shown in FIG. 1B, a multithreading processor according to the present invention has multiple register files 103a-n and a privileged architecture unit 150 that includes per-thread (or thread context (TC)) register(s) 130, per-virtual processing element (VPE) register(s) 132, 134 and per-processor register(s). In an embodiment, privileged architecture unit 150 is coprocessor 122.

In an embodiment, each thread that can be executed concurrently by the processor has its own associated register file 103. In addition, each thread has its own associated thread register(s) 130, which are part of privileged architecture unit 150. In an embodiment, these per-thread registers include load-linked (L-L) registers 123a-n. In an embodiment, each thread also has its own associated program counter register (not shown), which is used to hold the memory address for the next instruction of the thread to be executed. In an embodiment, each thread also has its own multiply/divide unit result and accumulator registers (not shown).

A virtual processing element (VPE) 200 (shown in FIG. 2 and discussed in detail below) includes multiple thread contexts registers 130, each thread context associated with a distinct register file 103. The multiple hardware thread contexts of a single virtual processing element 200 share VPE state registers (e.g. state registers 132 or 134) and utilize resources of a single physical processor 100 for processing instructions.

A multithreading processor may have one or more virtual processing elements. Each virtual processing element of a processor appears to software to be a separate processor e.g., a multithreading processor having two virtual processing elements appears to software to be the same as two separate processors. A virtual processing element is an instantiation of the Operating System visible state of a processor, while each thread context is a replication in hardware of the state of a user-level application programming model. Thread contexts share common elements, i.e. fetch and decode logic, pipelines and caches and memory of processor 100. To an application or Operating System, each virtual processing element and/or thread context appears to be a fully featured processor. This allows each thread context in each virtual processing element to run distinct Operating Systems, processes and threads concurrently. Conventional threading techniques have multiple tasks or software threads running on a single core with context switches between the software threads. In contrast, with a virtual processing element running multiple hardware thread contexts, an important advantage is that there is no cost of switching between tasks or threads since each hardware thread context has its own register file 103. The virtual processing element structure minimizes cache misses and allows a programmer and software to fill an open slot in the pipeline by switching to another thread context and inserting, with no delays, another task to be performed. It is to be appreciated that the embodiments presented herein are applicable to multi-threaded processors/application as well as processors that do not support multi-threading.

In the example of FIG. 1B, register(s) 132 are associated with a first virtual processing element (VPE-0). Register(s) 134 are associated with a second virtual processing element (VPE-1).

In an embodiment, privileged architecture unit 150 also includes shared register(s) 136. In an embodiment, shared register(s) 136 are registers that provide, for example, an inventory of the processor's resources (e.g., how many threads can be executed concurrently, how many virtual processing elements are implemented, etc.).

As shown in FIG. 1B, information stored in the registers of privileged architecture unit 150 can be communicated to execution unit 102 and/or thread control unit 105. In this manner, a policy manager of thread control unit 105 knows, for example, the value stored in each load-linked register 123 of privileged architecture unit 150.

Figure 2:
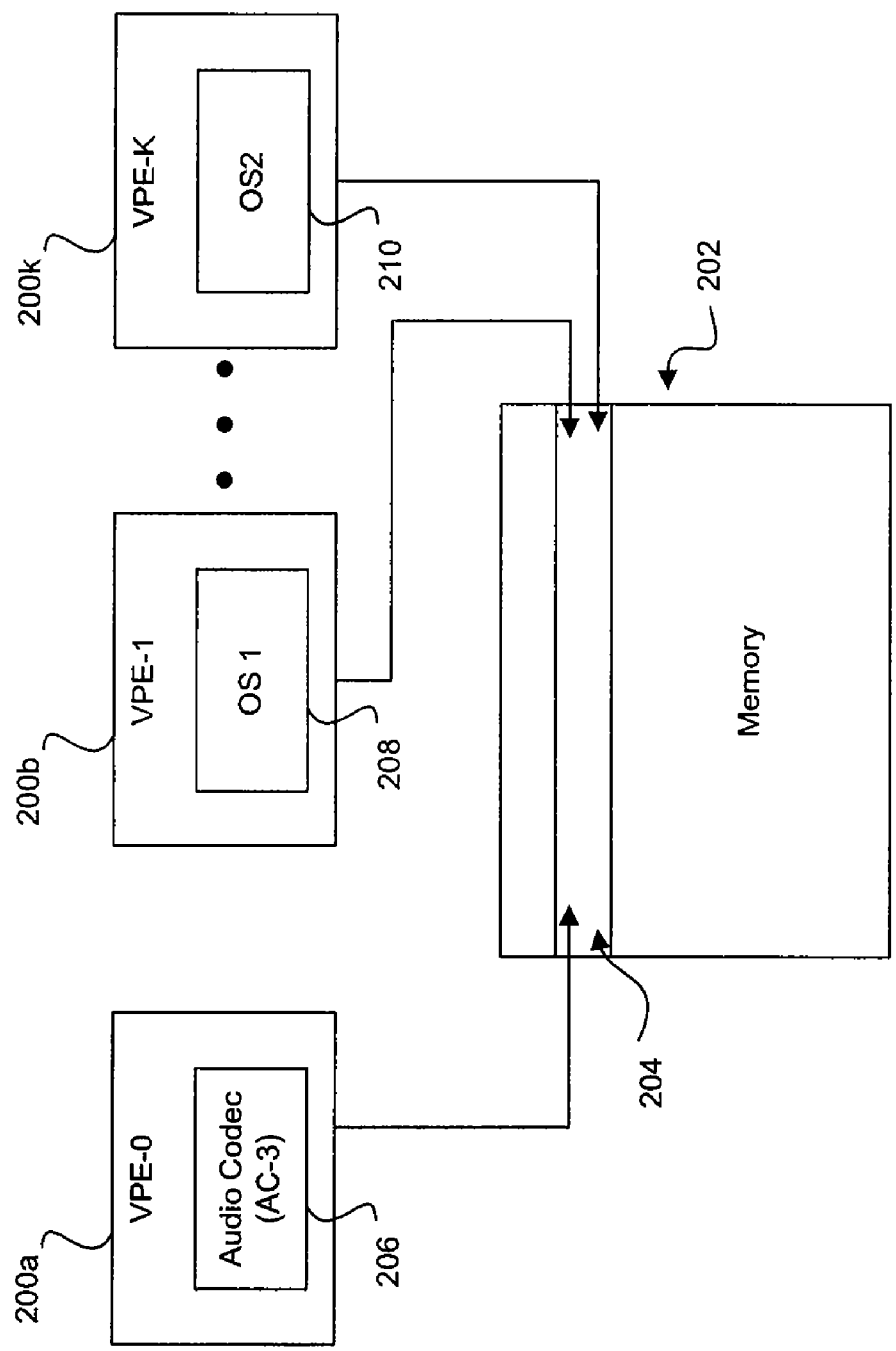
FIG. 2 illustrates applications running on distinct multiple virtual processing elements accessing a memory location.

FIG. 2 illustrates applications running on distinct virtual processing elements 200a-k accessing a shared memory 202. More specifically, FIG. 2 illustrates memory 202, memory location 204 in memory 202, audio codec 206 running on virtual processing element 200a, a operating system (OS1) 208 running on virtual processing element 200b and operating system (OS2) 210 running on virtual processing element 200k. It is to be appreciated that memory 202 may be any form of memory including but not limited to, for example, data cache, instruction cache, translation lookaside buffer, main memory or SPRAM. In an embodiment, audio codec 206 is an Active Coding-3 (AC-3), OS1 208 is a Linux operating system and OS2 210 is a Windows operating system or a thread independent of OS 1.

Audio codec 206 running on virtual processing element 200a, operating system 208 running on virtual processing element 200b and operating system 210 running on virtual processing element 200k are unaware of each other and are therefore unable to coordinate access to memory 202. For example, audio codec 206 may over-write a value at memory location 204 that was previously written by operating system 208. Should this occur, when operating system 208 later reads memory location 204, it will read a corrupted value. In another example, malicious software running on operating system 210 may access memory locations, e.g. memory location 204 used by audio codec 206 and corrupt operation of audio codec 206.

Since software running on virtual processing elements 200a-k do not coordinate memory access, virtual processing elements 200a-k may read corrupted values from memory 202. Coordinating memory access between software running on virtual processing elements 200a-k significantly increases overhead since each virtual processing element 200 will have to signal atomic locking and releasing of a memory location.

Figure 3:
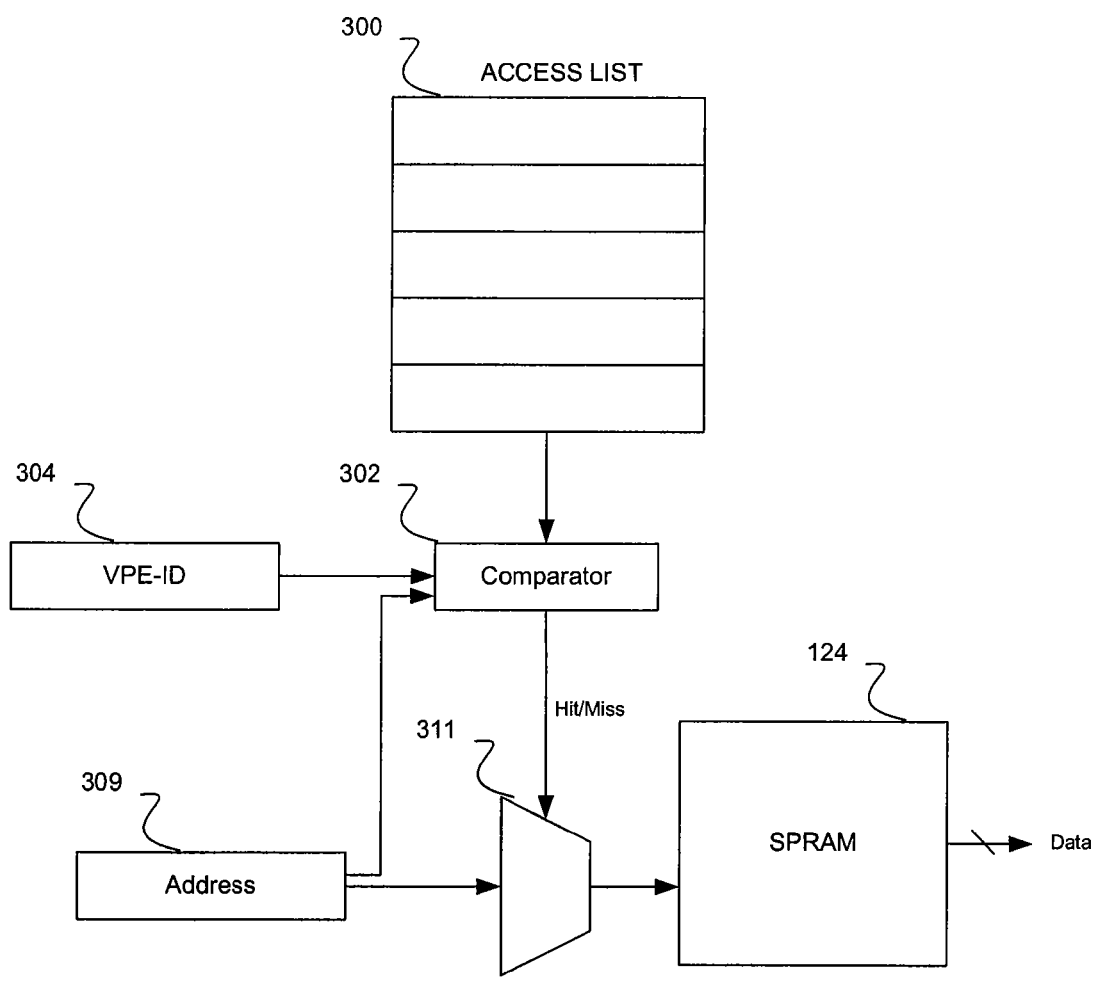
FIG. 3 illustrates a system to access a memory location in memory based on a virtual processing element identification associated with a load or store instruction according to an embodiment of the invention.

FIG. 3 illustrates a system to access a memory location in memory 124 based on a virtual processing element identification associated with a load or store instruction according to an embodiment of the invention. More specifically, FIG. 3 illustrates memory 124, virtual processing element comparator 302, virtual processing element access list 300, mux 311, virtual processing element identification 304 and address 309. Comparator 302 is coupled to access list 300 and memory 124.

In an embodiment, virtual processing element identification 304 is associated with a load or store instruction and is not part of the address 309 used to access a memory location. In an embodiment, virtual processing element identification 304 is generated by a virtual processing element and propagates through the pipeline with an associated load or store instruction and address 309. It is to be appreciated that in other embodiments, virtual processing element identification 304 may alternatively be generated by control logic in one or more units of processor 100 described above.

Access list 300 stores the virtual processing element identification for a virtual processing element that is allowed to access memory 124. Access list 300 is instantiated in hardware during synthesis and is not accessible by software for reads or writes thereby preventing the access list from being changed either by erroneous overwrites or by malicious software. In an embodiment, access list 300 is a hardware instantiated table that stores identification numbers for multiple virtual processing elements that are allowed access to memory 124. Access list 300 may also store an address range (as shown in table 2) to which a particular virtual processing element has access. In an embodiment access list 300 is stored in a Read Only Memory (ROM) instead of being instantiated in hardware. In an embodiment, access list 300 is a register that stores a single virtual processing element identification that is granted access to memory 124. Determination of which virtual processing element 200 is to have access to memory 124 is made prior to fabrication. Once the access list 300 is instantiated in hardware or ROM, the virtual processing element(s) 200 that have access to memory cannot be changed. In an alternate embodiment, access list 300 can be read to determine which virtual processing element has access to memory 124. In yet another embodiment, access list 300 is stored in flash memory and is flash programmable to change which virtual processing element has access to memory 124. Table 1 below illustrates an example access list 302 storing virtual processing element identifications of virtual processing elements that have access to memory 124.

TABLE 1

| VPE_ID |
| --- |
| VPE_0 |
| VPE_2 |
| ... |
| VPE_k |

In response to a load or store instruction from a virtual processing element to access a memory location in memory 124, comparator 302 compares virtual processing element identification 304 associated with the instruction to one or more virtual processing element identifications stored in the access list 300. If the virtual processing element identification 304 has a match then the virtual processing element originating the load or store instruction is granted access to read or write to the requested memory location in memory 124. If virtual processing element identification 304 is not equal to virtual processing element identification(s) stored in access list 300, then the virtual processing element is not granted access to the requested memory location in memory 124. In an embodiment, access list 300 stores a single virtual processing element identification corresponding to each single virtual processing element that has access to memory 124.

Table 2 below illustrates an alternate embodiment of access list 300 for storing virtual processing element identifications along with associated range of addresses in memory 124 that may be accessed by the virtual processing element.

TABLE 2

| VPE_ID | Address Range |
| --- | --- |
| VPE_0 | 0x000-0x00A |
| VPE_2 | 0x00B-0x00C |
| VPE_7 | 0x00B-0x00C |
| ... | ... |
| VPE_K | 0xXXX-0xYYY |

In the example access list 300 show in table 2, virtual processing element 0 has protected access to addresses 0x000-0x00A since no other virtual processing element has access to these range of addresses. Virtual processing element 2 and virtual processing element 7 both have access to address range 0x00B-0x00C thereby having common access to the region of memory 124 specified by their associated address range. Virtual processing element 0 does not have access to address range 0x00B-0x00C and likewise, virtual processing elements 2 and 7 do not have access to address range 0x000-0x00A. Thus the address range specified for each virtual processing element specifies the portion of the memory 124 that it has access to.

In an embodiment, in response to a load or store instruction from a virtual processing element to access a memory location in memory 124, comparator 302 compares virtual processing element identification 304 associated with the instruction to the virtual processing element identifications stored in the access list 300 of table 2. Comparator 302 also checks whether the address 309 specified in the load/store instruction is within the range of addresses allocated to the requesting virtual processing element as specified in access list 300. If the virtual processing element identification 304 has a match and the address 309 is within the range of allocated addresses, then mux 311 based on hit/miss signal from comparator 302 grants virtual processing element originating the load or store instruction access to read or write to the requested memory location in memory 124 at requested address 309. If virtual processing element identification 304 is not equal to virtual processing element identification(s) stored in access list 300 or if the address 309 that is specified in the load/store instruction is outside the range of addresses allocated to the virtual processing element in access list 300, then the virtual processing element is not granted access to the requested memory location in memory 124 as specified by address 309.

Figure 4:
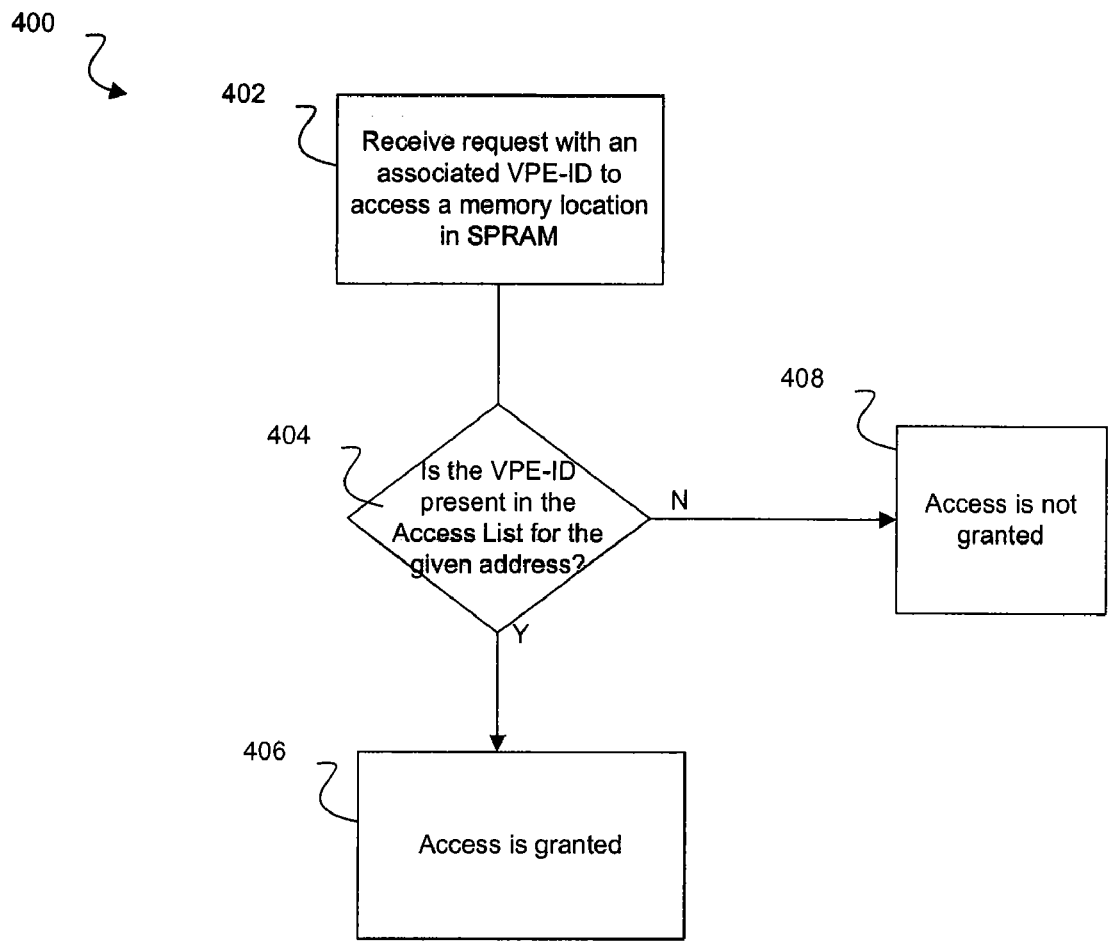
FIG. 4 illustrates an example flowchart of a method to access a memory location in a memory based on a virtual processing element identification according to an embodiment of the invention.

FIG. 4 illustrates an example flowchart 400 of a method to access a memory location in a memory based on a virtual processing element identification according to an embodiment of the invention. Flowchart 400 will be described with reference to the example operating environment depicted in FIGS. 1A-B and FIG. 3. However, the flowchart is not limited to these embodiments. Note that some steps shown in flowchart 400 do not necessarily have to occur in the order shown.

In step 402, a request is received from a virtual processing element to access a memory location in a memory. The request is associated with a first virtual processing element identification. The first virtual processing element identification is not a part of the address used to access the memory location in the memory.

In step 404 it is determined whether the first virtual processing element identification is equal to a second virtual processing element identification stored in a hardware instantiated virtual processing element identification access list. In an embodiment, it is also determined whether the address requested to be accessed by the virtual processing element is within a range of addresses that the virtual processing element has access to.

In step 406, if it is determined in step 404 that the first virtual processing element identification is equal to the second virtual processing element identification and the address is in the range of addresses that the virtual processing element has access to then, the requested memory location in the memory is accessed for the load or store operation.

In step 408, if it is determined in step 404 that the first virtual processing element identification is not equal to the second virtual processing element identification and/or if address is not in the range of addresses that the virtual processing element has access to, then the virtual processing element requesting access to a memory location in memory is not granted access. In an embodiment an error message may be generated to indicate that the virtual processing element does not have access to the memory.

Figure 5:
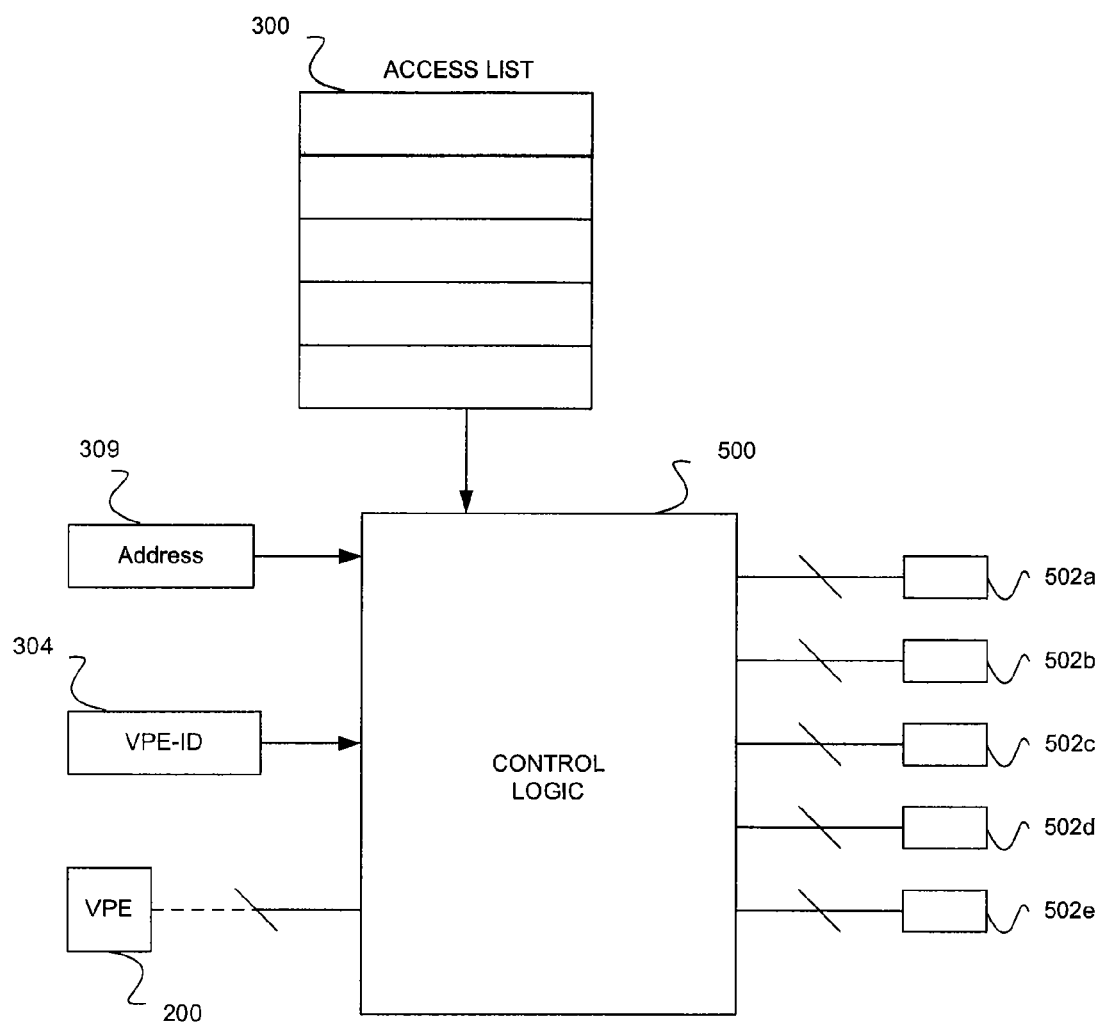
FIG. 5 illustrates a system to access an input/output (I/O) port based on a virtual processing element identification associated with an instruction according to an embodiment of the invention.

FIG. 5 illustrates a system to access a peripheral based on a virtual processing element identification associated with an instruction according to an embodiment of the invention. More specifically, FIG. 5 illustrates n peripherals 502a-n, peripheral control logic 500, virtual processing element access list 300, virtual processing element identification 304 and virtual processing elements 202. In an embodiment, peripheral 502 may be an I/O port.

Peripheral control logic 500 is coupled to access list 300 and peripherals 502a-n. Access list 300 stores the virtual processing element identification(s) for a virtual processing element(s) that are allowed to access a particular peripheral 502. Access list 300 is instantiated in hardware during synthesis and is not accessible by software. In an embodiment, access list 300 is a hardware instantiated table that stores identification numbers for multiple virtual processing elements that are allowed access to peripheral 502. In an embodiment, access list 300 is a register that stores a single virtual processing element identification. Determination of which virtual processing element will have access to which peripheral 502 is made prior to fabrication. Once the access list 300 is instantiated in hardware and/or Read Only Memory (ROM) the association of virtual processing element(s) with peripherals 502 cannot be changed. In an embodiment, access list 300 cannot be read by software. In an alternate embodiment, access list 300 can be read to determine which virtual processing element has access to which peripheral. In an embodiment, access list 300 may be flash programmable to change association of peripherals/peripherals 502 and virtual processing elements. Table 3 below illustrates an example access list 300 having associations of virtual processing element identifications and peripherals 502.

TABLE 3

| Peripherals | VPE_ID |
|---|---|
| 1 | VPE_0, VPE_1 |
| 2 | VPE_0, VPE_2 |
| 3 | VPE_4 |
| ... | ... |
| n | VPE_K |

In an alternate embodiment, memory addresses of peripherals/peripherals 502 may be associated with virtual processing element identifications. Table 4 below illustrates an example access list 502 having associations of memory addresses of peripherals with virtual processing element identifications.

TABLE 4

| Memory address of peripheral | VPE_ID |
|---|---|
| 0x000A | VPE_0, VPE_1 |
| 0xABCD | VPE_0, VPE_2 |
| 0xDCBA | VPE_4 |
| ... | ... |
| 0XXXX | VPE_K |

In the present embodiment, virtual processing element identification 304 is associated with an instruction used to access an peripheral 502 and is not part of the address 309 used to access the peripheral 502. Virtual processing element identification 304 is generated by a virtual processing element 200 and propagates through the pipeline with a load or store instruction In response to a request from a virtual processing element 200 to access an peripheral 502, peripheral control logic 500 compares virtual processing identification 304 associated with the instruction to a virtual processing identification stored in the access list 300. If the virtual processing element identifications match, then the virtual processing element originating the instruction is granted access to read or write to the requested peripheral 502. If virtual processing element identification 304 is not equal to virtual processing element identification stored in access list 300, then the virtual processing element 200 is not granted access to the requested peripheral 502. An error message may be generated to indicate that the particular virtual processing element 200 requesting access is not associated with the requested peripheral 502 or does not have permission to directly access the peripheral 502 based on the hardware instantiated access list 300.

In an alternate embodiment, in response to a request from a virtual processing element 200 to access a peripheral 502, peripheral control logic 500 compares the address 309 associated with the instruction to a virtual processing identification stored in the access list 300. If the virtual processing element identifications and address 309 match, then the virtual processing element originating the instruction is granted access to read or write to the requested peripheral 502 at requested address 309. If virtual processing element identification 304 is not equal to virtual processing element identification stored in access list 300 and/or if the address 309 of the peripheral is not equal to the address in list 300, then the virtual processing element 200 is not granted access to the requested peripheral 502 at address 309. An error message may be generated to indicate that the particular virtual processing element 200 requesting access is not associated with the requested peripheral 502 or does not have permission to directly access the peripheral 502 based on the hardware instantiated access list 300.

In an embodiment, examples of peripherals 502 include but are not limited to a transport mechanism (e.g. Universal Serial Bus (USB)), communications mechanism (e.g. token ring network), interface mechanism (e.g. IDE/ATE disk interface), adapter mechanism (e.g. RS232 connector), interconnect mechanism (e.g. interconnect bus), bus mechanism (e.g. system or memory bus) or a memory device coupled using a port including but not limited to Wireless Fidelity (WiFi) port, Bluetooth port, Transport Control Protocol/Internet Protocol (TCP/IP port) and Infrared Data Association (IrDA), Digital Radio Frequency (DigRF), High-Definition Multimedia Interface (HDMI), Ethernet port and Synchronous Dynamic (SD) memory card port.

Figure 6:
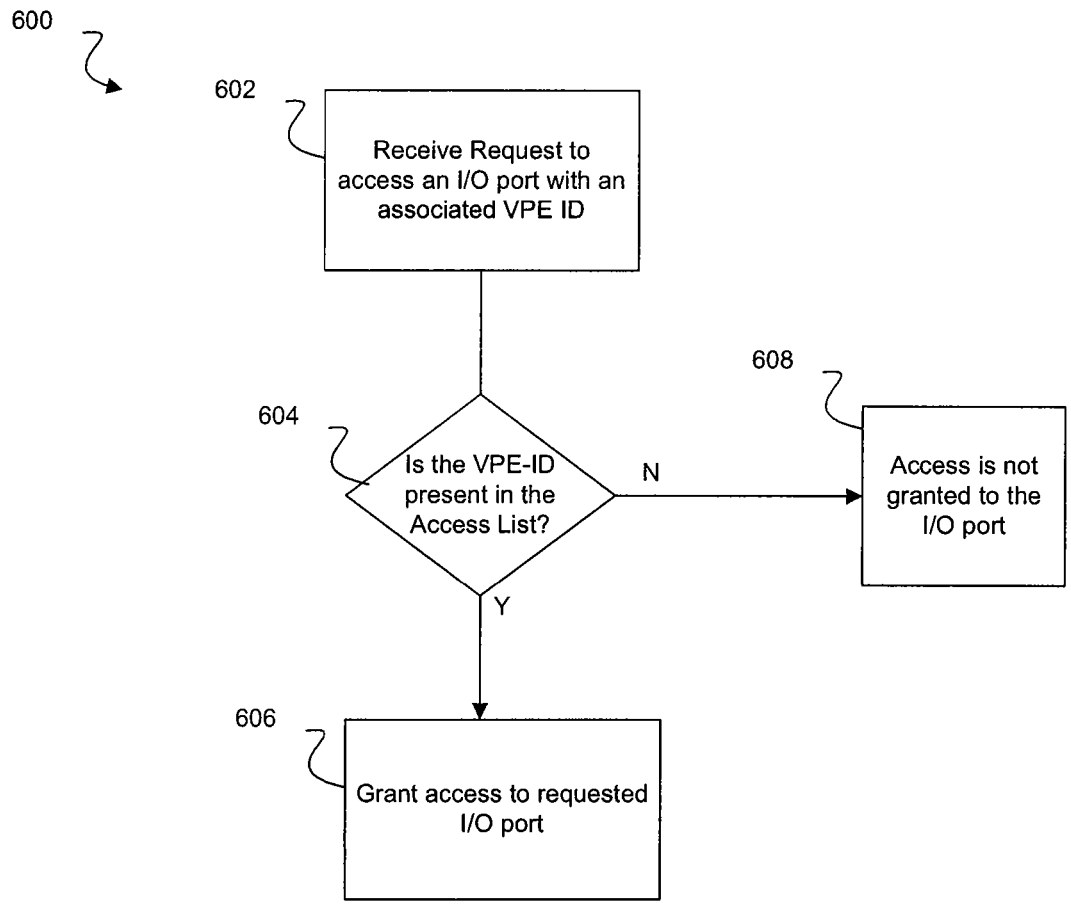
FIG. 6 illustrates an example flowchart of a method to access a peripheral based on a virtual processing element identification according to an embodiment of the invention.

FIG. 6 illustrates an example flowchart 600 of a method to access an peripheral based on a virtual processing element identification according to an embodiment of the invention. Flowchart 600 will be described with reference to the example operating environment depicted in FIGS. 1A-B and FIG. 5. However, the flowchart is not limited to these embodiments. Note that some steps shown in flowchart 600 do not necessarily have to occur in the order shown.

In step 602, a request is received from a virtual processing element to access an peripheral. The request has an associated first virtual processing element identification. The first virtual processing element identification is not part of the address used to access the peripheral. The request may also be associated with a memory address of the peripheral.

In step 604, it is determined whether the first virtual processing element identification is equal to a second virtual processing element identification stored in a hardware instantiated virtual processing element identification access list. In an alternate embodiment, the address associated with the request is also compared against the address associated with the virtual processing element in the access list.

In step 606, if it is determined in step 604 that the first virtual processing element identification is equal to the second virtual processing element identification, the virtual processing element is granted access to the requested peripheral. In an alternate embodiment if it is determined in step 604 that the first virtual processing element identification is equal to the second virtual processing element identification and the associated address from step 602 is equal to the peripheral address associated with the virtual processing element in the access list then, the virtual processing element is granted access to the requested peripheral.

In step 608, if it is determined in step 604 that the first virtual processing element identification is not equal to the second virtual processing element identification, then the virtual processing element is not granted access to the requested peripheral. In an alternate embodiment, if it is determined in step 604 that the first virtual processing element identification is not equal to the second virtual processing element identification or if the access list does not associate the requested memory address with the virtual processing element requesting access, then the virtual processing element is not granted access to the requested peripheral. In an embodiment, an error message may be generated to indicate that the virtual processing element does not have access to the requested peripheral.

Figure 7:
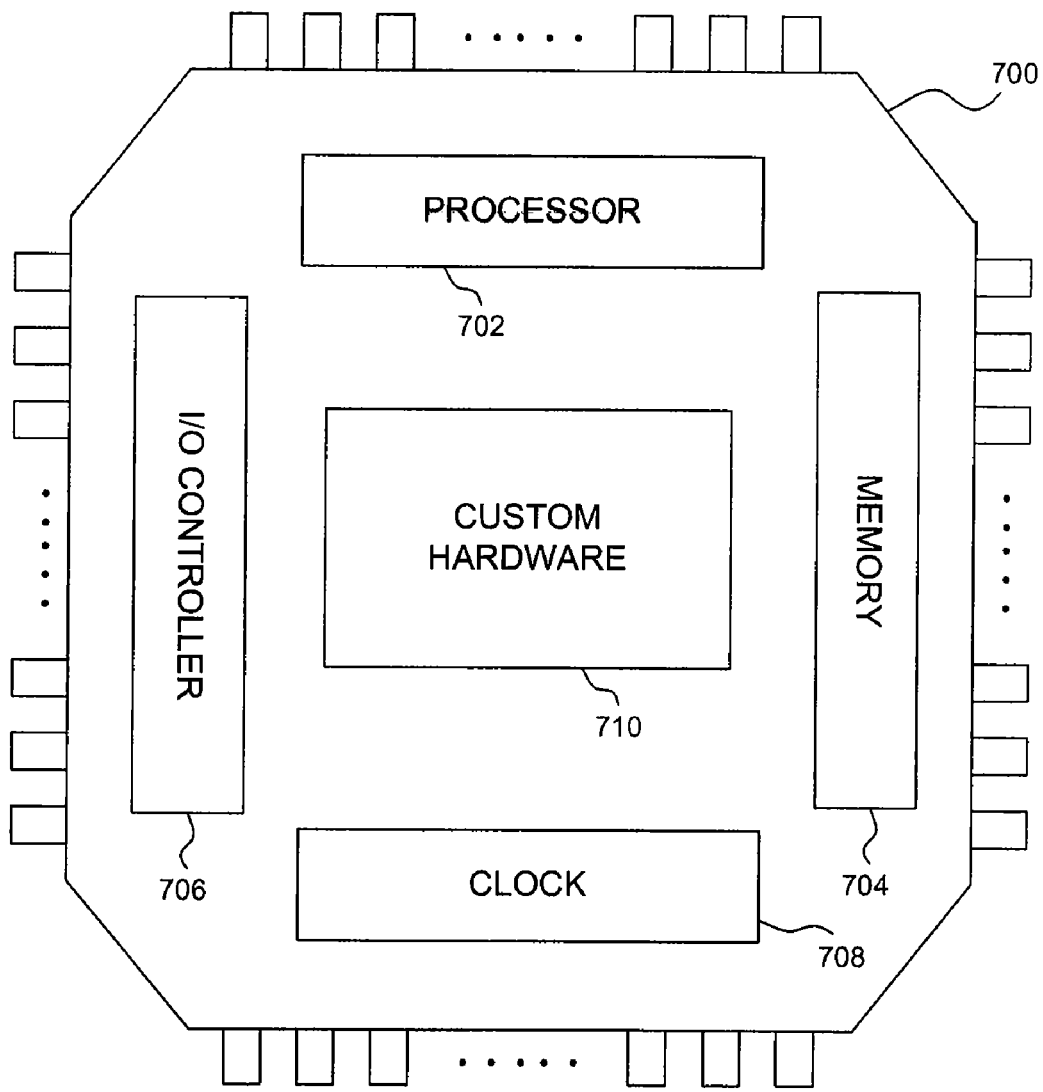
FIG. 7 is a diagram of an example system according to an embodiment of the present invention.

FIG. 7 is a diagram of an example system 700 according to an embodiment of the present invention. System 700 includes a processor 702, a memory 704, an input/output (I/O) controller 706, a clock 708, and custom hardware 710. In an embodiment, system 700 is a system on a chip (SOC) in an application specific integrated circuit (ASIC).

Processor 702 is any processor that includes features of the present invention described herein and/or implements a method embodiment of the present invention. In one embodiment, processor 702 includes an instruction fetch unit, an instruction cache, an instruction decode and dispatch unit, one or more instruction execution unit(s), a data cache, a register file, and a bus interface unit similar to processor 100 described above.

Memory 704 can be any memory capable of storing instructions and/or data. Memory 704 can include, for example, random access memory and/or read-only memory.

Input/output (I/O) controller 706 is used to enable components of system 700 to receive and/or send information to peripheral devices. I/O controller 706 can include, for example, an analog-to-digital converter and/or a digital-to-analog converter.

Clock 708 is used to determine when sequential subsystems of system 700 change state. For example, each time a clock signal of clock 708 ticks, state registers of system 700 capture signals generated by combinatorial logic. In an embodiment, the clock signal of clock 708 can be varied. The clock signal can also be divided, for example, before it is provided to selected components of system 700.

Custom hardware 710 is any hardware added to system 700 to tailor system 700 to a specific application. Custom hardware 710 can include, for example, hardware needed to decode audio and/or video signals, accelerate graphics operations, and/or implement a smart sensor. Persons skilled in the relevant arts will understand how to implement custom hardware 710 to tailor system 700 to a specific application.

While various embodiments of the present invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, SystemC Register Transfer Level (RTL), and so on, or other available programs. Such software can be disposed in any known computer usable medium such as semiconductor, magnetic disk, optical disk (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing an apparatus described herein by providing software describing the apparatus and subsequently transmitting the software as a computer data signal over a communication network including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and method embodiments described herein may be embodied as a combination of hardware and software. Thus, the present invention should not be limited by any of the above-described exemplary embodiments, but should be defined only in accordance with the following claims and their equivalence. Furthermore, it should be appreciated that the detailed description of the present invention provided herein, and not the summary and abstract sections, is intended to be used to interpret the claims. The summary and abstract sections may set forth one or more but not all exemplary embodiments of the present invention.

What is claimed is:

1. A hardware processor comprising:
   a plurality of virtual processing elements;
   an on-chip memory;
   an access list; and
   a comparator coupled to the memory and the access list,
   wherein in response to an instruction from one of the virtual processing elements to access a memory location in the memory, the comparator compares a first virtual processing identification associated with the instruction to a second virtual processing identification stored in the access list and grants access to the virtual processing element that generated the instruction to read from or write to the memory location if the first virtual processing element identification is equal to the second virtual processing element identification.

2. The hardware processor of claim 1, wherein a virtual processing element comprises at least one hardware thread context, each thread context associated with a distinct register file.

3. The hardware processor of claim 1, wherein data in the memory is allocated and de-allocated by software.

4. The hardware processor of claim 1, wherein the access list is instantiated in hardware and cannot be read from or written to by software.

5. The hardware processor of claim 1, wherein the access list is a register configured to store a virtual processing element identification.

6. The hardware processor of claim 1, wherein the access list is stored in flash memory and is flash programmable.

7. A hardware processor comprising:
   a plurality of input/output (I/O) ports;
   a plurality of virtual processing elements;
   an access list; and
   peripheral control logic coupled to the access list and peripherals,
   wherein in response to receiving a request from one of the virtual processing elements to access a peripheral, control logic compares a first virtual processing identification associated with the request to a second virtual processing identification stored in the access list and grants access to the virtual processing element that generated the request to access the peripheral if the first virtual processing element identification is equal to the second virtual processing element identification.

8. The hardware processor of claim 7, wherein a virtual processing element comprises at least one hardware thread context, each thread context associated with a distinct register file.

9. The hardware processor of claim 7, wherein the access list is instantiated in hardware and cannot be read from or written to by software.

10. The hardware processor of claim 7, wherein the access list is a register configured to stole a virtual processing element identification.

11. The hardware processor of claim 7, wherein the access list is stored in flash memory and is flash programmable.

12. The hardware processor of claim 7, wherein the peripheral is one of a Universal Serial Bus (USB) port, Wireless Fidelity (WiFi) port, Bluetooth, Transport Control Protocol/Internet Protocol (TCP/IP) port, Infrared Data Association (IrDA) port, Ethernet port, Synchronous Dynamic (SD) memory card port, Digital Radio Frequency (DigRF), High-Definition Multimedia Interface (HDMI), Compact Disk Drive port, Digital Video Disk Drive port and Blue Ray Disk drive port.

13. A method to access a memory location in an on-chip memory based on a virtual processing element identification, comprising:
   receiving a request from a virtual processing element to access the memory location, the request being associated with a first virtual processing element identification;
   comparing the first virtual processing element identification with a second virtual processing element identification stored in an access list; and
   accessing the memory location if the first virtual processing element identification is equal to the second virtual processing element identification;
   wherein a virtual processing element comprises at least one hardware thread context, each thread context associated with a distinct register file.

14. The method of claim 13, wherein the memory is allocated and de-allocated by software.

15. The method of claim 13, wherein the memory stores non-cacheable data.

16. The method of claim 13, wherein the access list is instantiated in hardware and cannot be read from or written to by software.

17. The method of claim 13, wherein the access list is a register configured to store a virtual processing element identification.

18. The method of claim 13, wherein the access list is stored in flash memory and is flash programmable.

19. The method of claim 13, wherein the memory is a scratch pad RAM (SPRAM).

20. The method of claim 13, wherein the memory is one of a Dynamic RAM (DRAM) or a Static RAM (SRAM).

21. A method to access a peripheral in a processor based on a virtual processing element identification, comprising:
   receiving a request from a virtual processing element to access the peripheral, the request being associated with a first virtual processing element identification;
   comparing the first virtual processing element identification with a second virtual processing element identification stored in an access list; and accessing the peripheral if the first virtual processing element identification is equal to the second virtual processing element identification;
wherein a virtual processing element comprises at least one hardware thread context, each thread context associated with a distinct register file.

22. The method of claim 21, wherein the access list is instantiated in hardware and cannot be read from or written to by software.

23. The method of claim 21, wherein the access list is a register configured to store a virtual processing element identification.

24. The method of claim 21, wherein the access list is stored in flash memory and is flash programmable.

25. A non-transitory computer-readable medium having stored thereon, computer-executable instructions that, if executed by a computing device, cause the computing device to synthesize a processor, the processor comprising:
a plurality of virtual processing elements;
an on-chip memory;
an access list; and
a comparator coupled to the memory and the access list,
wherein in response to an instruction from one of the virtual processing elements to access a memory location in the memory, the comparator compares a first virtual processing identification associated with the instruction to a second virtual processing identification stored in the access list and grants access to the virtual processing element that generated the instruction to read from or write to the memory location if the first virtual processing element identification is equal to the second virtual processing element identification.

26. A non-transitory computer-readable medium having stored thereon, computer-executable instructions that, if executed by a computing device, cause the computing device to perform a method comprising:
receiving, a request from a virtual processing element to access a memory location, the request being associated with a first virtual processing element identification;
comparing the first virtual processing element identification with a second virtual processing element identification stored in an access list; and
accessing the memory location if the first virtual processing element identification is equal to the second virtual processing element identification;
wherein a virtual processing element comprises at least one hardware thread context, each thread context associated with a distinct register file.

27. A non-transitory computer-readable medium having stored thereon, computer-executable instructions that, if executed by a computing device, cause the computing device to synthesize a processor, the processor comprising:
a plurality of input/output (I/O) ports;
a plurality of virtual processing elements;
an access list; and
peripheral control logic coupled to the access list and peripherals,
wherein in response to receiving a request from one of the virtual processing elements to access a peripheral, control logic compares a first virtual processing identification associated with the request to a second virtual processing identification stored in the access list and grants access to the virtual processing element that generated the request to access the peripheral if the first virtual processing element identification is equal to the second virtual processing element identification.

28. A non-transitory computer-readable medium having stored thereon, computer-executable instructions that, if executed by a computing device, cause the computing device to perform a method comprising:
receiving a request from a virtual processing element to access a peripheral, the request being associated with a first virtual processing element identification;
comparing the first virtual processing element identification with a second virtual processing element identification stored in an access list; and
accessing the peripheral if the first virtual processing element identification is equal to the second virtual processing element identification;
wherein a virtual processing element comprises at least one hardware thread context, each thread context associated with a distinct register file.

* * * * *